(12) United States Patent
Seko et al.

(10) Patent No.: US 11,608,903 B2
(45) Date of Patent: Mar. 21, 2023

(54) VALVE DEVICE

(71) Applicant: DENSO CORPORATION, Kariya (JP)

(72) Inventors: Naohito Seko, Kariya (JP); Yoshiaki Yamamoto, Kariya (JP); Shinichi Yokoyama, Kariya (JP); Yuuji Nakano, Kariya (JP); Ryo Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 22 days.

(21) Appl. No.: 17/345,082

(22) Filed: Jun. 11, 2021

(65) Prior Publication Data

US 2021/0301930 A1 Sep. 30, 2021

Related U.S. Application Data

(63) Continuation of application No. 16/282,332, filed on Feb. 22, 2019, now Pat. No. 11,067,180, which is a
(Continued)

(30) Foreign Application Priority Data

Jul. 7, 2014 (JP) .................................. 2014-139702
Jul. 7, 2014 (JP) .................................. 2014-139729
(Continued)

(51) Int. Cl.
*F16K 11/087* (2006.01)
*F01P 7/14* (2006.01)
(Continued)

(52) U.S. Cl.
CPC .......... *F16K 5/0663* (2013.01); *F16K 5/0689* (2013.01); *F16K 5/201* (2013.01);
(Continued)

(58) Field of Classification Search
CPC ...... F16K 5/0663; F16K 5/0689; F16K 5/201; F16K 11/085; F16K 11/087;
(Continued)

(56) References Cited

U.S. PATENT DOCUMENTS 3,894,718 A 7/1975 Koch
4,099,543 A 7/1978 Mong et al.
(Continued)

FOREIGN PATENT DOCUMENTS

DE 90 02 393 5/1990
DE 42 10 659 10/1993
(Continued)

*Primary Examiner* — Marina A Tietjen
(74) *Attorney, Agent, or Firm* — Nixon & Vanderhye P.C.

(57) ABSTRACT

A valve device includes: a ball valve having a ball face shaped in a convex spherical surface; and a valve seat having a seat face shaped in a concave spherical surface. The seat face is pressed onto the ball face. The ball valve is rotated to open a valve by communicating a valve opening defined in the ball valve and a seat opening defined in the valve seat with each other, and to close the valve by stop the communication. A diameter of the seat opening $\Phi 2$ is smaller than a diameter of the valve opening $\Phi 1$. A curvature radius of the ball face R1 is smaller than or equal to a curvature radius of the seat face is R2.

17 Claims, 10 Drawing Sheets

Related U.S. Application Data continuation of application No. 16/051,517, filed on Aug. 1, 2018, now Pat. No. 10,808,848, which is a continuation of application No. 15/121,201, filed as application No. PCT/JP2015/003131 on Jun. 23, 2015, now Pat. No. 10,066,751.

(30) Foreign Application Priority Data

| Jul. 7, 2014 | (JP) | ................................ | 2014-139759 |
| Jul. 7, 2014 | (JP) | ................................ | 2014-139789 |
| Sep. 5, 2014 | (JP) | ................................ | 2014-181346 |
| Apr. 21, 2015 | (JP) | ................................ | 2015-086608 |

(51) Int. Cl.
- F16K 5/06 (2006.01)
- F16K 5/20 (2006.01)
- F16K 31/04 (2006.01)

(52) U.S. Cl.
CPC ........ F16K 11/0876 (2013.01); F16K 31/041 (2013.01); *F01P 2007/146* (2013.01)

(58) Field of Classification Search
CPC ............ F16K 11/0873; F16K 11/0876; F16K 11/076; F16K 5/0621; F16K 31/041; F01P 7/14; F01P 7/16; F01P 2007/146
USPC ..... 251/286–287; 137/625.46–47; 123/41.08
See application file for complete search history.

(56) References Cited

U.S. PATENT DOCUMENTS

| 4,103,868 | A |   | 8/1978  | Thompson |   |
| 4,385,747 | A |   | 5/1983  | Renaud, Jr. |   |
| 4,403,626 | A |   | 9/1983  | Paul, Jr. |   |
| 4,410,165 | A |   | 10/1983 | Koch |   |
| 4,511,120 | A | * | 4/1985  | Conley | ................... F16K 5/045 251/312 |
| 4,602,762 | A |   | 7/1986  | Koch |   |
| 4,792,118 | A |   | 12/1988 | Yusko, Jr. |   |
| 4,821,772 | A |   | 4/1989  | Anderson, Jr. et al. |   |
| 4,993,453 | A |   | 2/1991  | McHugh |   |
| 5,139,230 | A | * | 8/1992  | Lester | ................... F16K 5/0647 251/285 |
| 5,727,596 | A |   | 3/1998  | Eminger |   |
| 6,000,430 | A |   | 12/1999 | Nafz |   |
| 6,240,946 | B1 |   | 6/2001 | Beasley |   |
| 6,695,285 | B1 |   | 2/2004 | Hotton |   |
| 7,988,128 | B2 | * | 8/2011 | Wentling | ............... A61M 39/22 604/32 |
| 10,066,751 | B2 |   | 9/2018 | Seko et al. |   |
| 10,808,848 | B2 |   | 10/2020 | Seko et al. |   |
| 2004/0159819 | A1 |   | 8/2004 | Hotton et al. |   |
| 2004/0173167 | A1 |   | 9/2004 | Chanfreau et al. |   |
| 2006/0201455 | A1 |   | 9/2006 | Chanfreau et al. |   |
| 2012/0112585 | A1 |   | 5/2012 | Kajiura |   |
| 2016/0010536 | A1 |   | 1/2016 | Murakami |   |
| 2016/0109031 | A1 |   | 4/2016 | Greene |   |
| 2017/0009894 | A1 |   | 1/2017 | Seko et al. |   |
| 2018/0340618 | A1 |   | 11/2018 | Seko et al. |   |
| 2019/0186641 | A1 |   | 6/2019 | Seko et al. |   |

FOREIGN PATENT DOCUMENTS

| DE | 10-2009-014047 |   | 9/2010 |   |   |
| DE | 102009035349 |   | 2/2011 |   |   |
| DE | 102009035349 | A1 * | 2/2011 | ................ F01P 7/14 |
| DE | 10-2011-083803 |   | 4/2013 |   |   |
| DE | 102012211116 | A1 * | 1/2014 | ................ F01P 7/14 |
| DE | 102013222157 | A1 * | 5/2015 | .......... F16K 11/0876 |
| EP | 2 295 757 |   | 3/2011 |   |   |
| FR | 2 355 221 |   | 1/1978 |   |   |
| GB | 2 105 010 |   | 3/1983 |   |   |
| JP | 44-31902 |   | 12/1969 |   |   |
| JP | 57-103977 |   | 6/1982 |   |   |
| JP | 1-62848 |   | 4/1989 |   |   |
| JP | 2-19980 |   | 2/1990 |   |   |
| JP | 2-51771 |   | 4/1990 |   |   |
| JP | 9-112715 |   | 5/1997 |   |   |
| JP | H09-178004 |   | 7/1997 |   |   |
| JP | 2008-504504 |   | 2/2008 |   |   |
| JP | 2008-232260 |   | 10/2008 |   |   |
| JP | 2013-24126 |   | 2/2013 |   |   |
| WO | WO-2014000995 | A1 * | 1/2014 | ................ F01P 7/14 |
| WO | WO-2014184783 | A1 * | 11/2014 | ............ F16K 11/085 |

\* cited by examiner

VALVE DEVICE

CROSS REFERENCE TO RELATED APPLICATION

This application is a continuation application of application Ser. No. 16/282,332, filed Feb. 22, 2019, which is a continuation application of application Ser. No. 16/051,517, filed Aug. 1, 2018 (now U.S. Pat. No. 10,808,848, issued Oct. 20, 2020), which is a continuation application of application Ser. No. 15/121,201, filed Aug. 24, 2016 (now U.S. Pat. No. 10,066,751, issued Sep. 4, 2018), which is the U.S. national phase of International Application No. PCT/JP2015/003131 filed Jun. 23, 2015, which designated the U.S. and claims priority to Japanese Patent Application No. 2014-139702 filed on Jul. 7, 2014, Japanese Patent Application No. 2014-139729 filed on Jul. 7, 2014, Japanese Patent Application No. 2014-139759 filed on Jul. 7, 2014, Japanese Patent Application No. 2014-139789 filed on Jul. 7, 2014, Japanese Patent Application No. 2014-181346 filed on Sep. 5, 2014, and Japanese Patent Application No. 2015-86608 filed on Apr. 21, 2015, the entire contents of each of which are hereby incorporated herein by reference.

TECHNICAL FIELD

The present disclosure relates to a valve device in which a concave spherical valve seat is pressed onto a convex spherical ball face, and for example, a technique suitably used for a valve device that controls cooling water as an example of fluid. The convex spherical face refers to a spherical shape protruding outward, and the concave spherical face refers to a spherical shape recessed inward.

BACKGROUND ART

In a conventional valve device, a concave spherical seat face of a valve seat is pressed onto a convex spherical ball face of a ball valve to rotate the ball valve, thereby switching communication and non-communication between a valve opening of the ball valve and a seat opening of the valve seat (see, for example, Patent Literature 1).

In the conventional valve device, a diameter of the seat opening matches a diameter of the valve opening. Alternatively, the diameter of the seat opening is larger than the diameter of the valve opening. The diameter of the opening is an inner diameter of each opening.

The seat face of the valve seat is pressed onto the ball face of the ball valve. The ball valve rotates at opening/closing and adjustment of the degree of opening. Thus, the ball face and the seat face slide in contact with each other under pressure.

Here, the ball face of the ball valve moves with respect to the seat face. For this reason, a site of the ball face in contact with the seat face at opening is different from a site of the ball face in contact with the seat face at closing. On the contrary, since the seat face does not move, the site of the seat face in contact with the ball face at opening is the same as the site of the seat face in contact with the ball face at closing.

That is, at closing of the valve, the ball face contacts the seat face only at closing, while the seat face contacts the ball face continuously from closing to full opening. Thus, the site of the ball face in contact with the seat face at closing is hard to wear.

On the contrary, the site of the seat face in contact with the ball face at closing slides on the ball face at all times and thus, is susceptible to wear. For this reason, when the valve device is used for a long time, the seat face that ensures a sealing property at closing wears earlier than the ball face that ensures the sealing property at closing, possibly causing leakage at closing.

The valve seat in Patent Literature 1 is assembled to a holding member using a cylindrical portion attached to the periphery of the valve seat. Since the cylindrical portion in Patent Literature 1 is an individual component for attaching the valve seat to the holding member, the number of components increases.

Further, since the cylindrical portion in Patent Literature 1 forms an annular groove receiving the valve seat, the axial length of the cylindrical portion is larger than the thickness of the valve seat. As described above, in the valve device having the conventional configuration, the valve seat is susceptible to wear. For this reason, when the valve seat continues to wear and becomes thinner, the ball valve may directly contacts the cylindrical portion, eliminating the sealing effect of the valve seat.

PRIOR ART LITERATURES

Patent Literature

Patent Literature 1: JP 2008-232260 A

SUMMARY OF INVENTION

An object of the present disclosure is to provide a valve device capable of restricting deterioration in the sealing property due to sliding wear.

According to an aspect of the present disclosure, a valve device includes: a ball valve having a ball face shaped in a convex spherical surface; and a valve seat having a seat face shaped in a concave spherical surface. The seat face is pressed onto the ball face. The ball valve is rotated to open a valve by communicating a valve opening defined in the ball valve and a seat opening defined in the valve seat with each other. A diameter of the seat opening is smaller than a diameter of the valve opening, and a curvature radius of the ball face is smaller than or equal to a curvature radius of the seat face. That is, a following relationship is satisfied: $\Phi1 > \Phi2$; and $R1 \leq R2$.

Thus, the site of the seat face in contact with the ball face at opening is different from the site of the seat face in contact with the ball face at closing. That is, the site of the seat face in contact with the ball face at closing to ensure the sealing property can be provided so as not to contact the ball face at opening. For this reason, wear of the site of the seat face in contact with the ball face at closing to ensure the sealing property can be reduced, ensuring the sealing property at closing for a long time.

BRIEF DESCRIPTION OF DRAWINGS

The above and other objects, features, and advantages of the present disclosure will be more apparent from following description with reference to appended figures.

DESCRIPTION OF EMBODIMENTS

Embodiments are specific examples, and as a matter of course, the present disclosure is not limited to the embodiments.

First Embodiment

Figure 1:
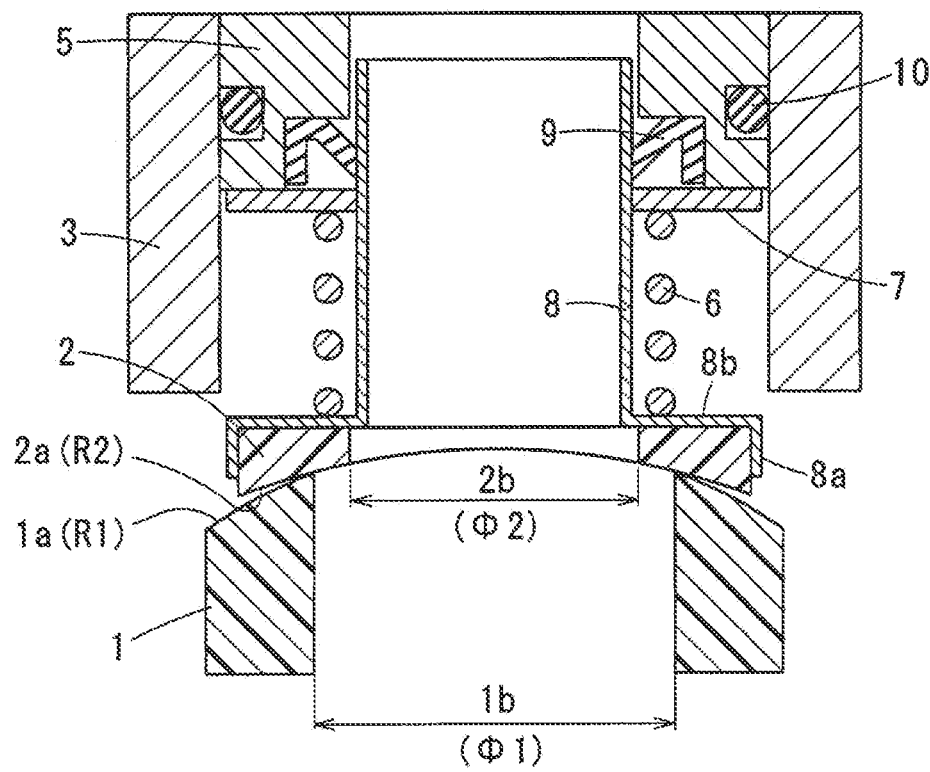
FIG. 1 is a sectional view illustrating a valve device at opening (a first embodiment).
Figure 2:
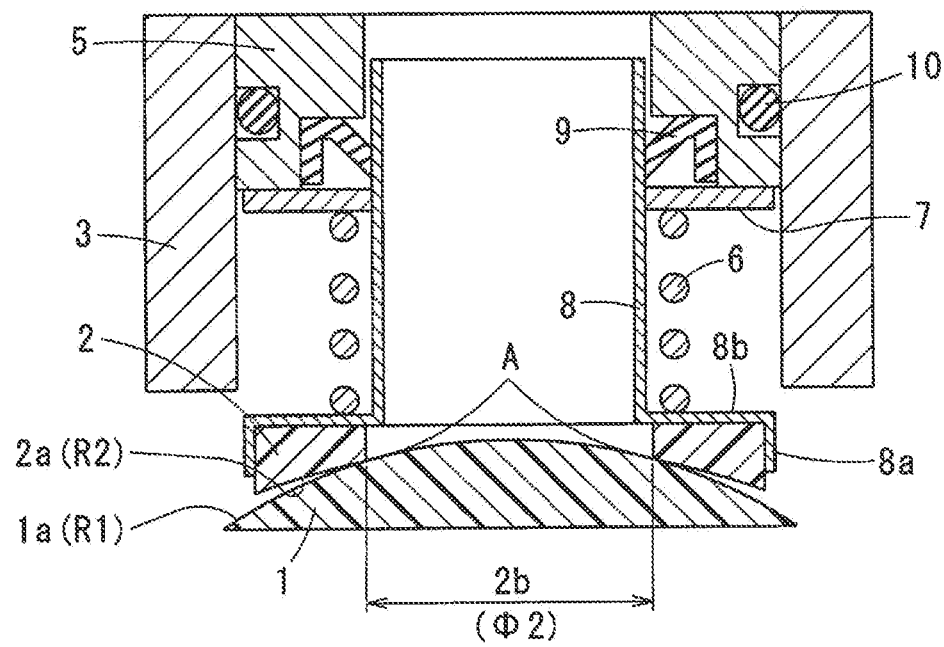
FIG. 2 is a sectional view illustrating the valve device at closing (the first embodiment).
Figure 3:
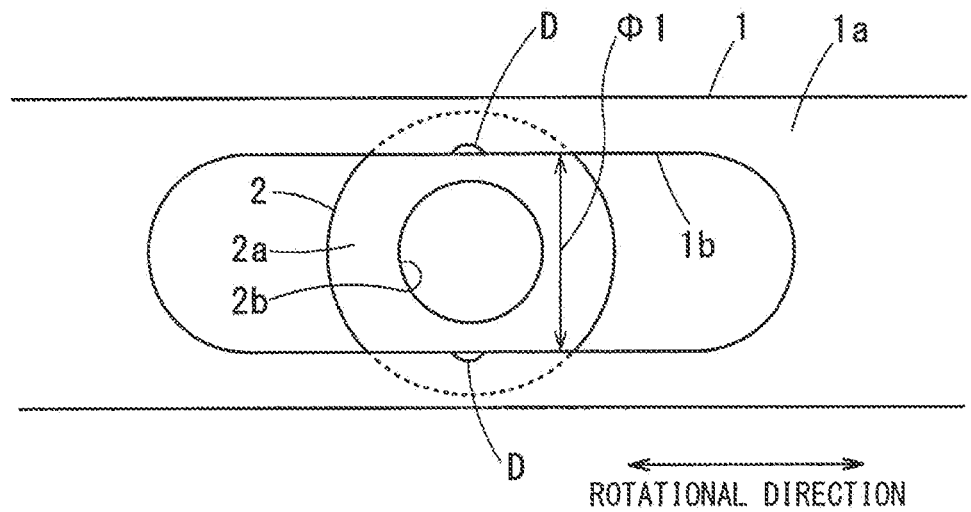
FIG. 3 is a view illustrating a contact site of a ball face and a seat face (the first embodiment).

As illustrated in FIG. 1 to FIG. 3, a valve device is mounted in a vehicle, and a seat face 2a of a valve seat 2 is pressed onto a ball face 1a of a ball valve 1 to rotate the ball valve 1, thereby controlling a flow rate or distribution of engine cooling water.

The valve device includes:
a housing 3 having an inlet through which cooling water is guided from an engine, and an outlet through which the cooling water is discharged, the cooling water being controlled in amount in the valve device;
a shaft rotatably supported with respect to the housing 3;
an electrical actuator that rotates the shaft;
a ball valve 1 that rotates integrally with the shaft; and
a ring-shaped valve seat 2 pressed onto the ball valve 1.

Specifically, the ball valve 1 has a valve opening 1b penetrating through the ball valve, and the valve seat 2 has a seat opening 2b penetrating the center of the valve seat 2. The ball valve 1 is rotated so as to communicate the valve opening 1b with the seat opening 2b to be opened, and so as not to communicate the valve opening 1b with the seat opening 2b to be closed.

As illustrated in FIG. 3, the valve opening 1b in the embodiment is an ellipse hole extending along the rotating direction of the ball valve 1. Specifically, the valve opening 1b is an ellipse hole having an edge that is parallel to the rotating direction of the ball valve 1.

The ball valve 1 is rotated by the electrical actuator via the shaft. For example, the ball valve 1 is substantially cup-shaped. Although the flow direction of cooling water is not limited, as an example for further understanding, cooling water supplied through the inlet is fed from a cup opening into the inside of the ball valve 1. When the ball valve 1 is opened, the cooling water fed to the inside of the ball valve 1 is guided to the outlet through an overlapping site of the valve opening 1b and the seat opening 2b.

The ball valve 1 is made of, for example, resin such as PPS, and the smooth ball face 1a having a convex spherical shape is in slide-contact with at least the valve seat 2. That is, the ball valve 1 has the convex spherical ball face 1a, and is rotated by the electrical actuator.

The valve seat 2 is a ring body having the seat opening 2b at its center, and is made of resin such as PTFE. The concave spherical seat face 2a of the valve seat 2 is pressed onto the ball face 1a of the ball valve 1, and smoothly slides on the ball face 1a.

The valve seat 2 is supported by the housing 3, and the housing 3 has a support portion that supports the valve seat 2.

The support portion is configured of:
a spacer 5 fixed to a passage wall of the housing 3;
a spring 6 disposed between the valve seat 2 and the spacer 5;
a plate 7 disposed between the spring 6 and the spacer 5; and
a sleeve 8 that supports the valve seat 2.

The spacer 5 is fixed to, for example, an inner wall of the passage leading to the outlet by press-fitting, and is substantially cylindrical. For example, the spring 6 is a compression coil spring, and is assembled in the compressed state. The plate 7 is a metal spring washer shaped like a ring-like circular plate.

The sleeve 8 is a substantially cylindrical passage member that supports the valve seat 2 at one end closer to the ball valve 1 and is inserted into the spacer 5 at the other end farther from the ball valve 1, and serves to guide cooling water passing through the seat opening 2b to the outlet.

Specifically, the sleeve 8 is made of a metal material having a high corrosion resistance, such as stainless steel, and at one end of the tubular sleeve 8, a tubular body 8a that locks an outer end of the valve seat 2 from the outer side in the radial direction, and a ring plate 8b that is in press-contact with the opposite face of the seat are integrally provided as means for supporting the valve seat 2. The seat opposite face is a face opposite to the seat face 2a of the valve seat 2.

A more specific example will be described below. An outer end of the valve seat 2 in the embodiment is a cylindrical face formed on the outer circumferential edge of the ring-like valve seat 2. The tubular body 8a locks the outer end of the valve seat 2 to prevent extension of the valve seat 2, and is shaped like a cylinder that is shorter in the axial direction than in the radial direction. The cylindrical face at the outer end of the valve seat 2 is pressed into the inner circumferential face of the tubular body 8a by press-fitting, to prevent the tubular body 8a from expanding in the radially outer direction of the valve seat 2.

The seat opposite face of the valve seat 2 is a ring-like plane, and the ring plate 8b is provided on the ring-like plane. Specifically, the ring plate 8b extends from the sleeve 8 inserted on the inner side of the spring 6 in a stepped manner outward in the radial direction. The inner circumferential face of the tubular body 8a locks the cylindrical face at the outer end of the valve seat 2, keeping the press-contact of the seat opposite face with the ring plate 8b. Keeping the press-contact of the seat opposite face with the ring plate 8b prevents deformation such as warp of the valve seat 2.

A seal member 9 such as a lip seal is disposed between the sleeve 8 and the spacer 5, and a seal member 10 such as an O ring is disposed between the housing 3 and the spacer 5.

In the valve device, the site of the seat face 2a in contact with the ball face 1a at opening is different from the site of the seat face 2a in contact with the ball face 1a at closing. The configuration will be specifically described below.

In the valve device, to differentiate the site of the seat face 2a in contact with the ball face 1a at opening from the site of the seat face 2a in contact with the ball face 1a at closing, the site of the seat face 2a, which is not in contact with the ball face 1a at opening, is provided on the inner side of the seat face 2a.

Specifically, the seat face 2a in the embodiment has a site that slides on the opening edge of the valve opening 1b in parallel with the site, on the radially outer side of the seat opening 2b. After a long-term use, the sliding site generates a step D due to wear.

As a specific means, a diameter Φ2 of the seat opening 2b is made smaller than a diameter Φ1 of the valve opening 1b. That is, given that the diameter of the valve opening 1b is Φ1, and that the diameter of the seat opening 2b is Φ2, the valve device in the embodiment is provided so as to satisfy the relationship Φ1>Φ2.

Here, as described above, the valve opening 1b in the embodiment is an ellipse hole extending in the rotating direction of the ball valve 1, and has an opening edge extending in parallel in the rotating direction. Thus, as illustrated in FIG. 3, the diameter Φ1 of the valve opening 1b is determined depending on the width of the ball valve 1 in the rotation axial direction.

In the valve device in the embodiment, to differentiate the site of the seat face 2a in contact with the ball face 1a at opening from the site of the seat face 2a in contact with the ball face 1a at closing, the site of the seat face 2a, which is not in contact with the ball face 1a at opening, needs to be provided so as to contact the ball face 1a to ensure the sealing property at closing. Specifically, the radially inner side of the seat face 2a needs to reliably contact the ball face 1a at closing.

Thus, a curvature radius R1 of the ball face 1a is equal to or smaller than a curvature radius R2 of the seat face 2a. That is, given that the curvature radius of the ball face 1a is R1 and that the curvature radius of the seat face 2a is R2, the valve device in the embodiment is provided so as to satisfy the relationship R1 R2.

As a specific example, in the embodiment, a contact ring A that contacts the ball face 1a only at closing is provided at an end of the seat face 2a on the radially inner side. The contact ring A is a seal ring formed using a curvature difference between the convex spherical ball face 1a and the concave spherical seat face 2a.

Specifically, as mentioned above, the ball face 1a is a convex spherical face, and the seat face 2a is a concave spherical face. In the embodiment, the curvature radius R1 of the ball face 1a is set to be smaller than the curvature radius R2 of the seat face 2a.

In this manner, using the curvature difference between the ball face 1a and the seat face 2a, the contact ring A that contacts the ball face 1a at closing may be provided at only the end of the seat face 2a on the radially inner side.

In the valve device in the embodiment, the site of the seat face 2a in contact with the ball face 1a at opening is different from the site of the seat face 2a in contact with the ball face 1a at closing. That is, the site of the seat face 2a in contact with the ball face 1a at closing to ensure the sealing property does not contact the ball face 1a at opening.

Thus, wear of the site of the seat face 2a in contact with the ball face 1a at closing to ensure the sealing property can be suppressed for a long time, ensuring the sealing property at closing for a long time. Thus, long-term reliability of the valve device can be increased.

As described above, the valve opening 1b in the embodiment is an ellipse hole along the rotating direction of the ball valve 1. For this reason, when the ball valve 1 is rotated, the edge of the ellipse hole locally contacts a portion of the seat face 2a, generating the local step D in the seat face 2a due to wear.

However, even when the step D occurs in the seat face 2a, since the site of the step D is located on the radially outer side of the contact ring A that ensures the sealing property at closing, the step D does not effect on the sealing property at closing.

As described above, in the embodiment, even when the step D occurs in the seat face 2a, the edge of the ellipse hole forming the valve opening 1b can ensure the sealing property at closing for a long time.

As described above, the valve device in the embodiment is provided with the contact ring A that contacts the ball face 1a only at closing, on the radially inner end of the seat face 2a.

The contact ring A can suppress wear caused by sliding as described above, and can control the contact width between the ball face 1a and the seat face 2a by using the curvature difference between the ball face 1a and the seat face 2a. Accordingly, a load of the spring 6 can be focused on the contact ring A, improving the sealing property between the ball face 1a and the seat face 2a.

Even when the contact width of the contact ring A slightly increases due to wear after long-term use, the site of the seat face 2a in contact with the ball face 1a at closing can be limited on the radially inner side of the seat face 2a ensuring the sealing property at closing.

Second Embodiment

Figure 4:
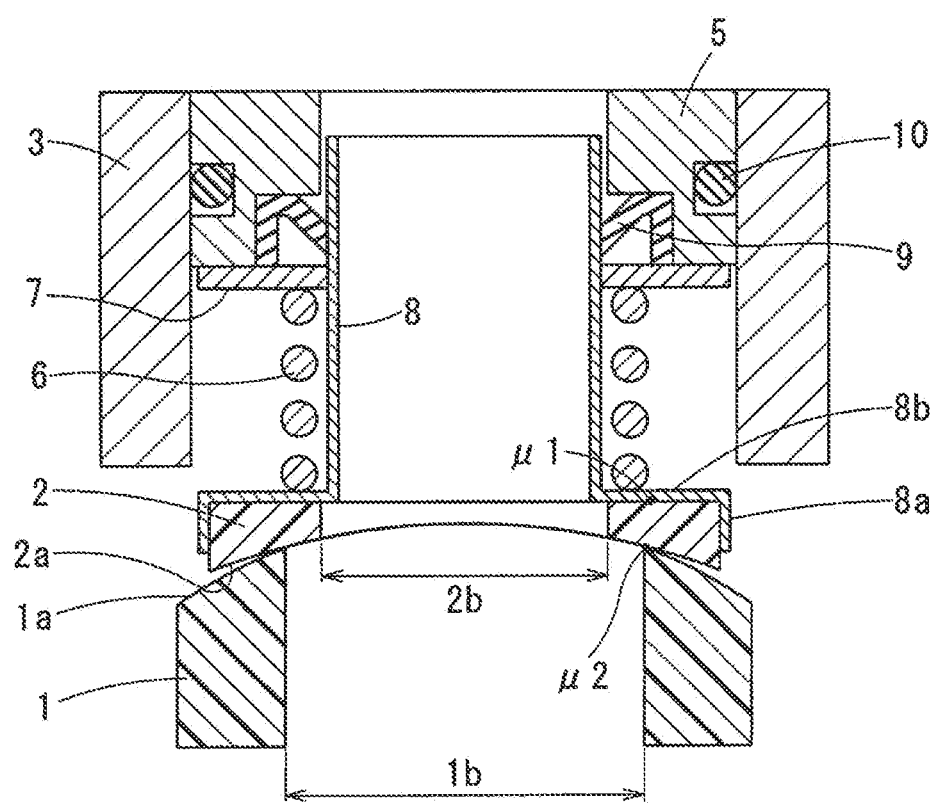
FIG. 4 is a sectional view illustrating a valve device at opening (a second embodiment).

A second embodiment will be described below with reference to FIG. 4.

Each of following embodiments adopt the mode in the first embodiment, and only differences between the embodiments and the first embodiment will be described below. The elements having the same function in following embodiments as the element in the first embodiment are given the same reference numerals.

The valve device includes a rigid body that prevents deformation of the valve seat 2. The rigid body locks at least the outer end of the valve seat 2 to prevent the valve seat 2 from extending in the radially outer side, and is provided integrally with the sleeve 8. Specifically, the sleeve 8 including the rigid body is made of metal such as stainless steel, and is provided by press working, trimming, or the like.

Here, the rigid body locks both of the cylindrical face at the outer end of the valve seat 2 and the seat opposite face. Specifically, the seat opposite face of the valve seat 2 is provided on the flat ring face, and the rigid body is configured of the tubular body 8a that covers the cylindrical face on the outer circumference of the valve seat 2, and the flat ring plate 8b that is in press-contact with the whole seat opposite face that is a flat face. The specific example of the tubular body 8a and the ring plate 8b is described in the first embodiment, detailed description thereof is omitted.

As described above, the rigid body locks the valve seat 2, and the valve seat 2 is fixed to the rigid body. The technique of coupling the valve seat 2 to the rigid body is not specifically limited, and press-fitting is adopted as an example.

As described above, in the valve device, the tubular body 8a locks at least cylindrical face on the outer end of the valve seat 2. Thus, even when the valve seat 2 is made of resin or the like, the radially outer side of the seat face 2a is prevented from extending outward due to the effect of the ball face 1a. That is, the valve seat 2 can be prevented from extending outward, avoiding leakage caused by deformation of the valve seat 2 for a long time.

As described above, in the valve device, the tubular body 8*a* locks at least cylindrical face on the outer end of the valve seat 2, suppressing deformation of the valve seat 2. For this reason, even when the valve opening 1*b* of the ball valve 1 is an ellipse hole, the valve seat 2 is not deformed into elliptical shape, preventing leakage caused by deformation of the valve seat 2.

In the valve device, the curvature radius of the ball face 1*a* is set to be smaller than the curvature radius of the seat face 2*a*. Then, the contact site between the seat face 2*a* and the ball face 1*a* becomes extremely local, possibly causing deformation such as warp of the valve seat 2 due to the local stress concentration.

However, the rigid body in the second embodiment locks the cylindrical face on the outer end of the valve seat 2 as well as the seat opposite face. Specifically, the tubular body 8*a* locks at least cylindrical face on the outer end of the valve seat 2, in the state where the seat opposite face is in press-contact with the ring plate 8*b*. For this reason, even when the contact site between the seat face 2*a* and the ball face 1*a* becomes extremely local, deformation such as warp of the valve seat 2 can be prevented, avoiding leakage caused by deformation of the valve seat 2 for a long time.

In the valve device, both of the ball face 1*a* and the seat face 2*a* are smooth, and the friction coefficient $\mu 1$ between the ring plate 8*b* and the valve seat 2 in the rigid body is larger than the friction coefficient $\mu 2$ between the ball valve 1 and the valve seat 2.

Accordingly, at rotation of the ball valve 1, the ball valve 1 can reliably slide on the valve seat 2 at the contact site, suppressing slippage of the valve seat 2 with respect to the ring plate 8*b*.

The tubular body 8*a* is integrally formed with the ring plate 8*b*. Thus, even when the tubular body 8*a* is relatively thin, the ring plate 8*b* acts to prevent deformation of the tubular body 8*a*. Thus, for example, even when the tubular body 8*a* is thin and thus, the tubular body 8*a* alone lacks in strength, the ring plate 8*b* can further prevent deformation of the tubular body 8*a*.

That is, even when the rigid body is relatively thin, combination of the tubular body 8*a* and the ring plate 8*b* can effectively prevent the deformation of the valve seat 2.

Patent Literature 1 discloses a cylindrical portion that covers the valve seat 2. The cylindrical portion in Patent Literature 1 is an individual component for assembling the valve seat 2 to the holding member, increasing the number of components.

On the contrary, the tubular body 8*a* in the valve device in the embodiment is provided integrally with the sleeve 8 that serves as a guide for the spring 6. Specifically, the sleeve 8 in the embodiment integrally has the portion inserted in the inner side of the spring 6 to guide the spring 6, the tubular body 8*a* that guides the valve seat 2, and the ring plate 8*b* that supports the valve seat 2. This can reduce the number of components of the valve device, and improve assembling of the valve device because of the reduction in the number of the components.

The cylindrical portion disclosed in Patent Literature 1 is a component forming an annular groove that receives the valve seat 2 and thus, the length of the cylindrical portion in the axial direction is formed to be longer than the thickness of the valve seat 2. Thus, when the valve seat 2 wears due to sliding of the ball valve 1, the ball valve 1 may contact the cylindrical portion, eliminating the sealing effect of the valve seat 2.

On the contrary, according to the present embodiment, the length of the tubular body 8*a* provided at the end of the sleeve 8 in the axial direction is formed to be smaller than the thickness of the outer circumferential edge of the valve seat 2. That is, a portion of the outer circumferential edge of the valve seat 2 protrudes from the tubular body 8*a* toward the ball valve 1.

Thus, even when the valve seat 2 wears due to sliding of the ball valve 1, the ball valve 1 can be prevented from contacting the sleeve 8 to improve long-term reliability of the valve device.

The above-mentioned advantage will be described more specifically.

As described in the first embodiment, the valve device in the second embodiment satisfies relationship $\Phi 1 > \Phi 2$ and $R1 \leq R2$. As a specific example, the valve device is provided so as to satisfy relationship $\Phi 1 > \Phi 2$ and $R1 < R2$.

For this reason, as described in the advantage 1 in the first embodiment, the site of the seat face 2*a* in contact with the ball face 1*a* at opening is different from the site of the seat face 2*a* in contact with the ball face 1*a* at closing, preventing wear of the valve seat 2 for a long time.

In addition to the advantage, in the second embodiment, by setting the axial length of the tubular body 8*a* to be smaller than the thickness of the outer circumferential edge of the valve seat 2, a portion of the outer circumferential edge of the valve seat 2 protrudes from the tubular body 8*a* toward the ball valve 1.

For this reason, even when the valve seat 2 that suppresses wear because of the advantage of the first embodiment wears after long-term use, the tubular body 8*a* can be formed to be short, preventing the ball valve 1 from contacting the sleeve 8 to ensure long-term reliability of the valve device.

Third Embodiment

Figure 5:
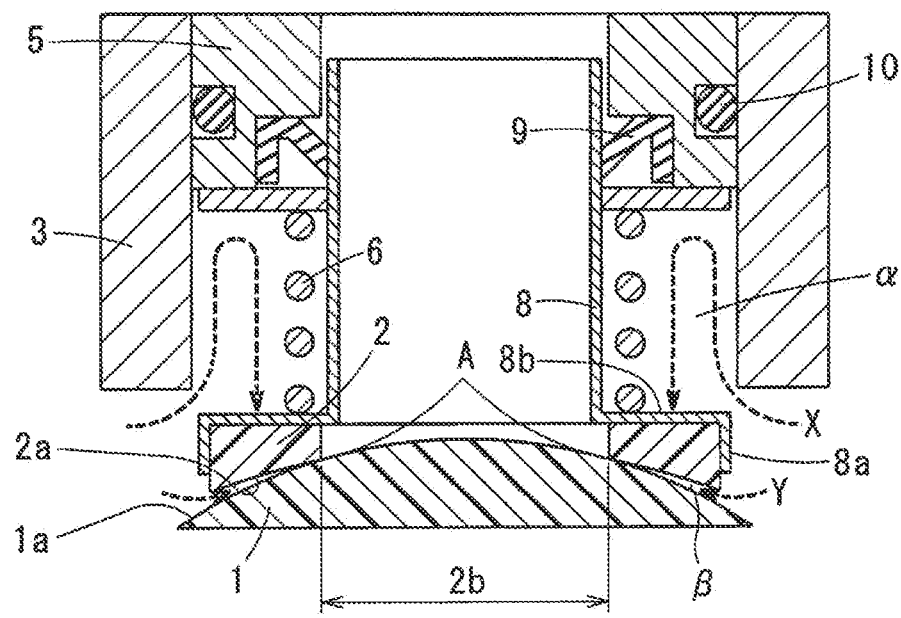
FIG. 5 is a sectional view illustrating a valve device at closing (a third embodiment).

A third embodiment will be described below with reference to FIG. 5. At closing, the valve device intentionally guides water pressure to both of the seat face 2*a* and the seat opposite face of the valve seat 2. The configuration will be specifically described below. A back pressure space $\alpha$ in which cooling water flows from the inlet to the inside of the valve device is formed on the side of the seat opposite face.

Specifically, the back pressure space $\alpha$ is a space around the sleeve 8 at which the spring 6 is disposed. In more detail, the back pressure space $\alpha$ is a space surrounded with the sleeve 8, the plate 7, the ring plate 8*b*, and the passage wall of the housing 3 leading to the outlet. The back pressure space a communicates with the space that houses the ball valve 1 in the housing 3 via a gap between the housing 3 and the ring plate 8*b*. The space that houses the ball valve 1 communicates with the inlet at all times. Thus, as represented by a broken arrow X in the figure, cooling water is guided from the engine into the back pressure space $\alpha$ through the inlet.

Here, the ring plate 8*b* provided at one end of the sleeve 8 extends from the sleeve 8 to the radially outer side in a stepped manner. As a result, the pressure of water guided to the back pressure space $\alpha$ is applied to the face of the ring plate 8*b* seated by the spring 6.

As a result, as the water pressure increases, the force to press the valve seat 2 onto the ball valve 1 becomes larger.

The contact ring A that causes only the radially inner side of the seat face 2*a* to contact the ball face 1*a* is provided at the portion where the ball face 1*a* is opposed to the seat face 2*a* at closing.

Although the shape and the contact width of the contact ring A are not specifically limited, a specific example of the contact ring A will be described below. In the embodiment, the curvature radius of the ball face $1a$ is smaller than the curvature radius of the seat face $2a$. With the configuration, the curvature difference between the ball face $1a$ and the seat face $2a$ forms the contact ring A that causes only the end of the seat face $2a$ on the radially inner side to contact the ball face $1a$ at closing.

Providing the contact ring A forms an annular gap β, into which cooling water flows, on the outer circumferential side of the contact ring A, and between the ball valve 1 and the valve seat 2 at closing. The annular gap β communicates with a space that houses the ball valve 1 in the housing 3 and leads to the inlet. Thus, as represented by a broken arrow Y, cooling water is commonly guided to the annular gap β and the back pressure space α.

The pressure of water guided to the annular gap β is applied to the seat face $2a$. As a result, as water pressure increases, a force to separate the valve seat 2 from the ball valve 1 becomes larger.

A circulatory system of engine cooling water in a vehicle adopts a well-known sealed pressurized cooling method. In the method, when the engine is driven to increase water temperature, water pressure rises to, for example, a valve opening pressure of a radiator cap. That is, the pressure of cooling water supplied from the engine to the inlet of the valve device varies.

As described above, the valve device in the embodiment is provided with the back pressure space α and the annular gap β, and intentionally guides water pressure to the seat face $2a$ and the seat opposite face of the valve seat 2 at closing.

This can offset the force applied from the seat opposite face to the valve seat 2 and the force applied from the seat face $2a$ to the valve seat 2 each other.

Thus, the force to press the valve seat 2 onto the ball valve 1 can be brought closer to only the biasing force of the spring 6, and even when water pressure increases or decreases, a change in the force to press the valve seat 2 onto the ball valve 1 can be suppressed. This can keep a sliding resistance between the ball valve 1 and the valve seat 2 substantially constant.

Specifically, since the driving force to rotate the ball valve 1 can be suppressed, the electrical actuator that rotates the ball valve 1 can be reduced in size. Sliding wear can be suppressed to increase long-term reliability of the valve device.

In the valve device, the curvature radius of the ball face $1a$ is made smaller than the curvature radius of the seat face $2a$, and the curvature difference between the ball face $1a$ and the seat face $2a$ forms the contact ring A that contacts the ball face $1a$ at the radially inner end of the seat face $2a$. For this reason, it is no need to process the contact ring A into an annular rib, reducing costs for forming the annular gap β.

The valve device applies the pressure of water guided to the back pressure space a to the ring plate $8b$ extended at one end of the sleeve 8, acting the pressure onto the seat opposite face via the ring plate $8b$.

With the configuration, cooling water can be guided from the outer circumferential side of the back pressure space α to the back pressure space α, as well as from the outer circumferential side of the annular gap β to the annular space. Specifically, cooling water can be directly guided from the space that houses the ball valve 1 in the housing 3 to both the back pressure space α and the annular gap β.

In the valve device, a pressure-receiving projection area in which water pressure is applied to the seat opposite face from the back pressure space α is the substantially same as a pressure-receiving projection area in which water pressure is applied to the seat face $2a$ from the annular gap β.

Accordingly, a difference between water pressure that acts on the seat opposite face of the valve seat 2 and water pressure that acts on the seat face $2a$ can be made closer to zero, bringing a force applied to the valve seat 2 by water pressure to almost zero.

Thus, the sliding resistance between the ball valve 1 and the valve seat 2 can be kept more constant, thereby suppressing an increase in the driving force for the ball valve 1 due to an increase in water pressure more reliably.

Fourth Embodiment

Figure 6:
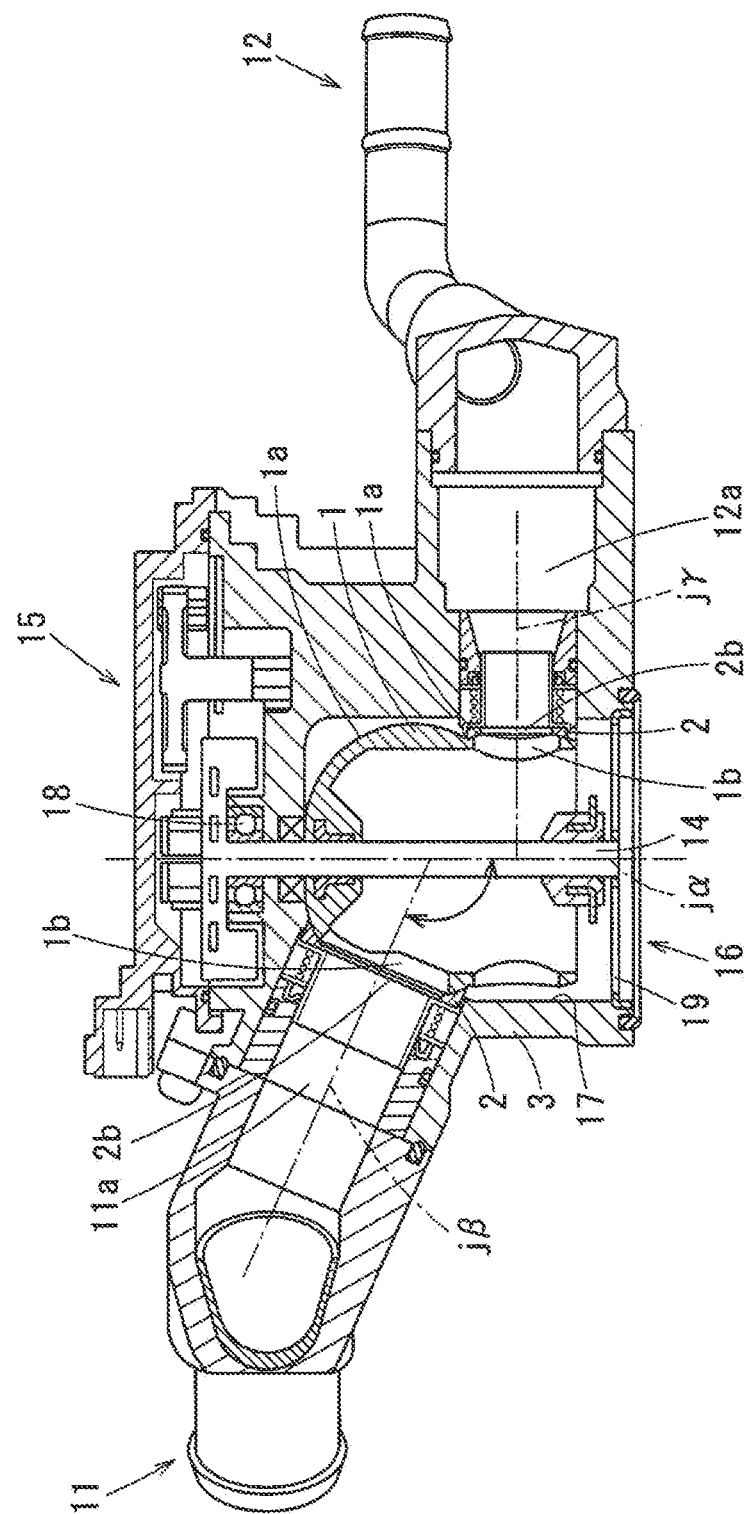
FIG. 6 is a sectional view illustrating a valve device taken along an axial direction (a fourth embodiment).
Figure 7:
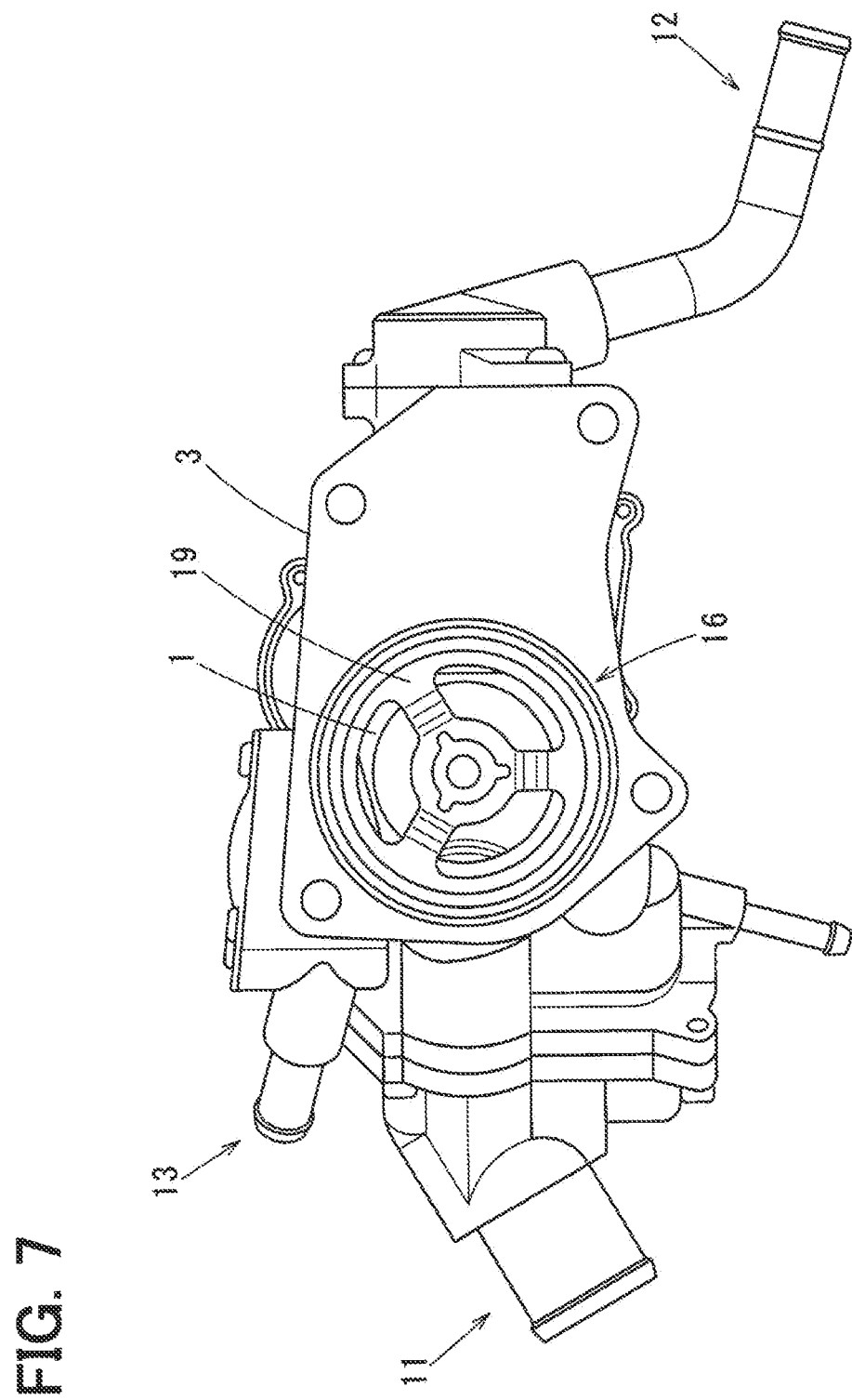
FIG. 7 is a view illustrating the valve device when viewed in an axial direction (the fourth embodiment).
Figure 8:
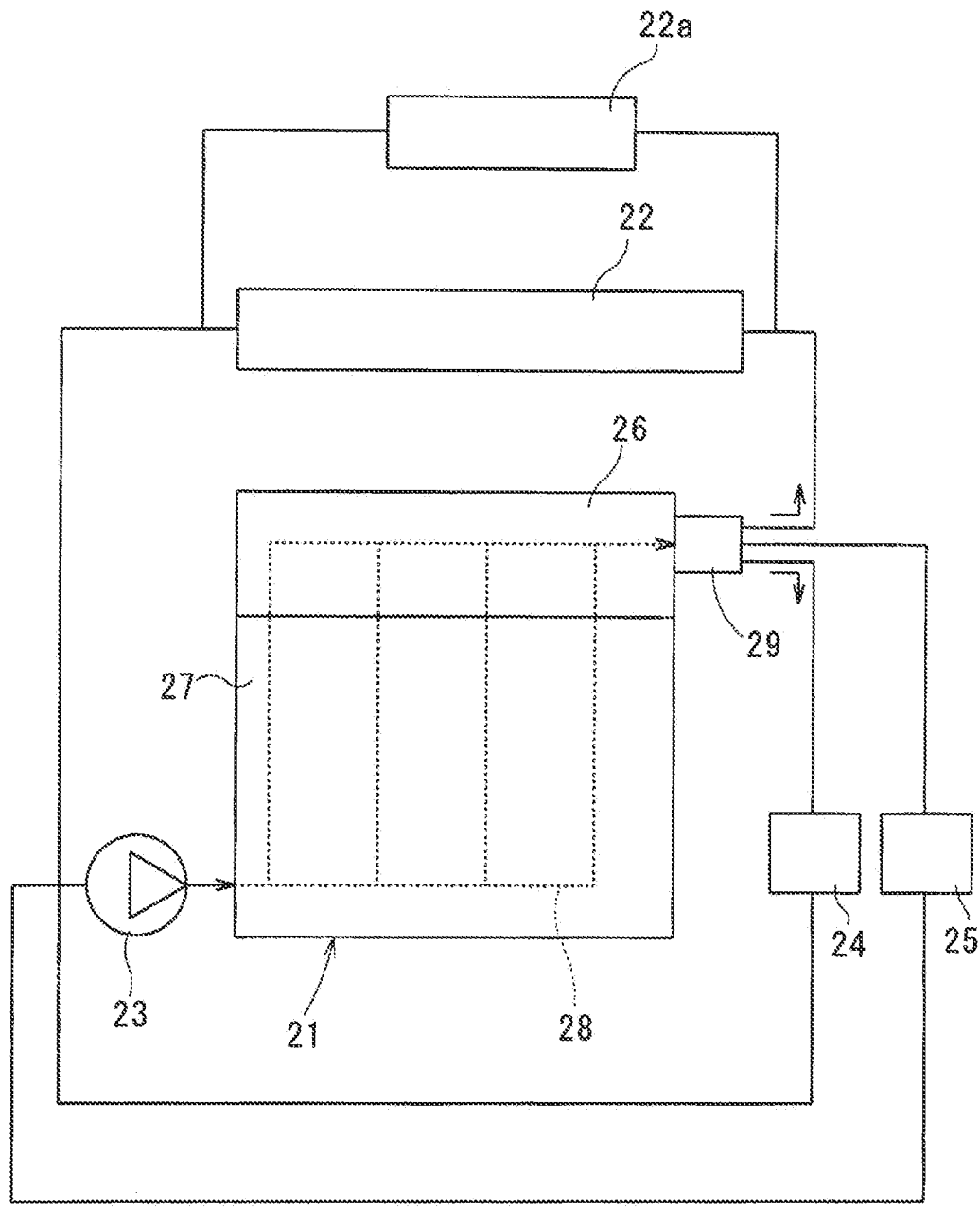
FIG. 8 is a schematic view illustrating an engine cooler (a fifth embodiment).
Figure 9:
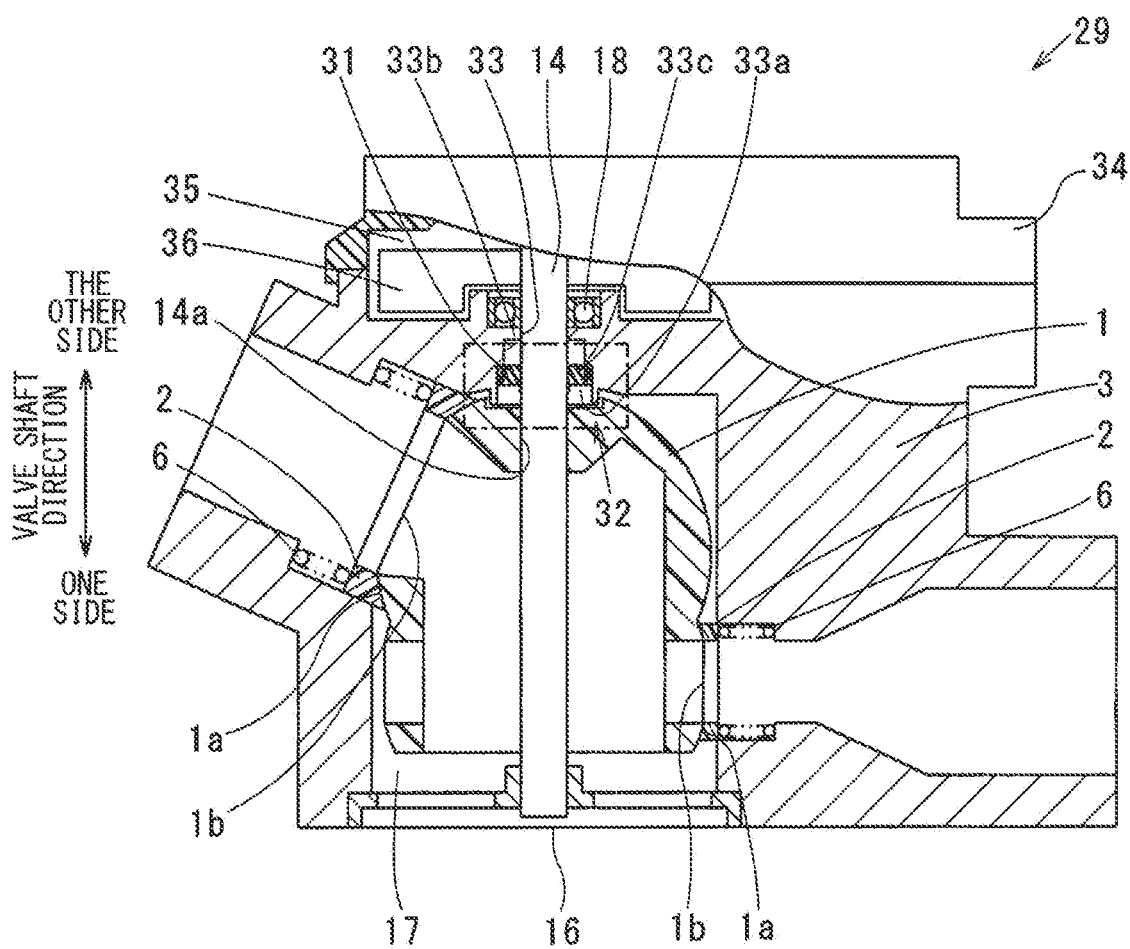
FIG. 9 is a sectional view illustrating a valve device (the fifth embodiment).
Figure 10:
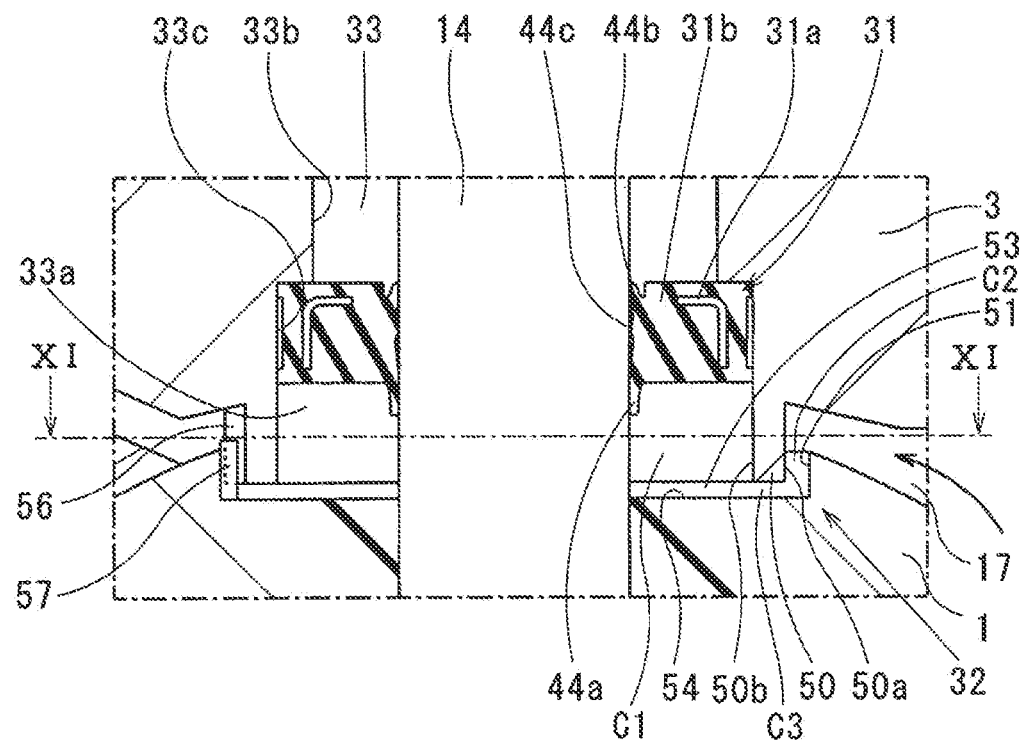
FIG. 10 is a partial enlarged view of FIG. 9 (the fifth embodiment).
Figure 11:
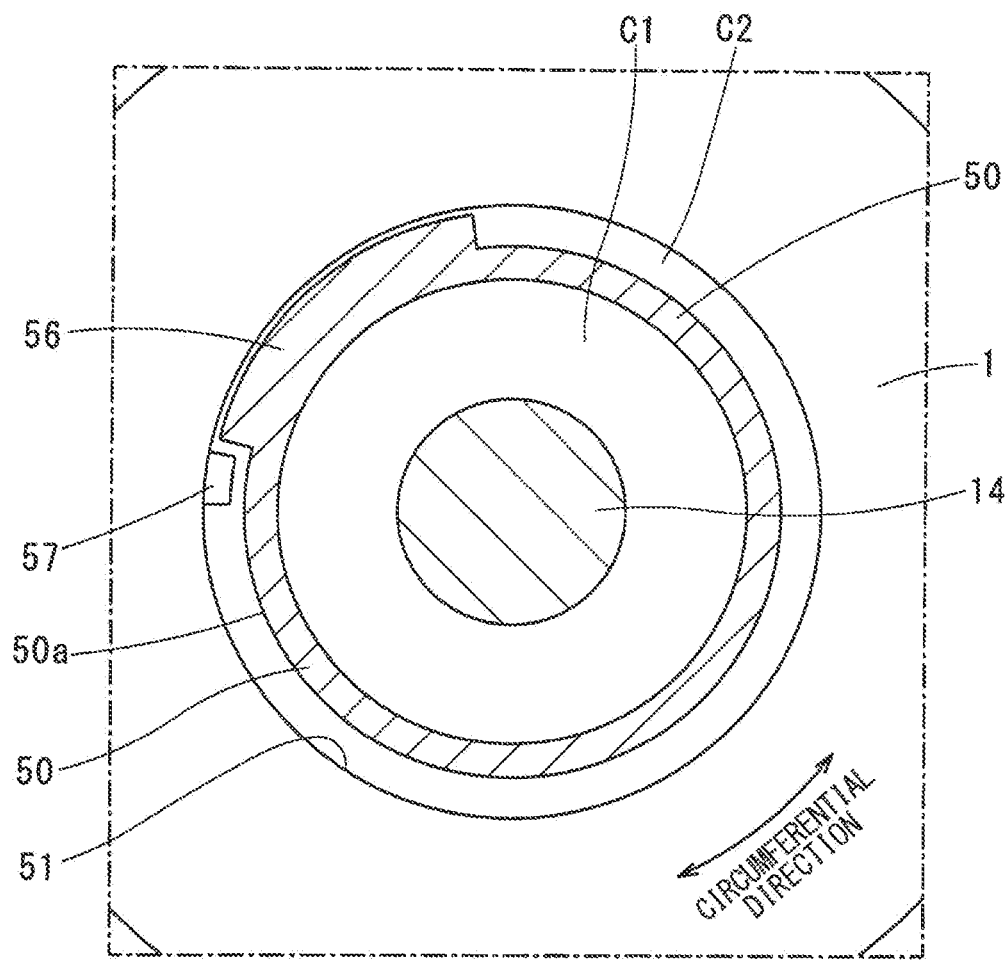
FIG. 11 is a sectional view taken along XI-XI in FIG. 10 (the fifth embodiment).

A fourth embodiment will be described with reference to FIGS. 6 and 7. The housing 3 of the valve device includes three cooling water outlets. The three cooling water outlets are distinguished one another as first to third outlets 11 to 13. The first outlet 11 is a cooling water outlet that guides cooling water passing through the engine to a radiator. The second outlet 12 is a cooling water outlet that guides cooling water passing through the engine to an air-conditioning heater core. The third outlet 13 is a cooling water outlet that guides cooling water passing through the engine to an oil cooler or an oil warmer of a transmission.

Configuration for opening or closing the first to third outlets 11 to 13 is the same as the valve device disclosed in the first embodiment, and includes:

a housing 3;

a shaft 14 rotatably supported with respect to the housing 3;

an electrical actuator 15 that rotates the shaft 14;

a ball valve 1 that rotates integrally with the shaft 14; and a ring-like valve seat 2 pressed onto the ball valve 1.

As an example, the housing 3 is directly assembled to the engine, and the engine attachment face has an inlet 16 that guides cooling water to the inside of the housing 3. Specifically, a valve chamber 17 that communicates with the inlet 16 and houses the ball valve 1 is provided in the housing 3, and a space between the valve chamber 17 and the ball valve 1 is filled with cooling water supplied from the inlet 16.

The housing 3 has a first outlet passage $11a$ that guides cooling water from the valve chamber 17 to the first outlet 11, a second outlet passage $12a$ that guides cooling water from the valve chamber 17 to the second outlet 12, and a third outlet passage (not illustrated) that guides cooling water from the valve chamber 17 to the third outlet 13.

Although not limited, in the housing 3, the first outlet passage $11a$ is farther from the inlet 16, and the second outlet passage $12a$ and the third outlet passage are closer to the inlet 16.

The first outlet passage $11a$ is a flow path in which cooling water flows from the engine toward the radiator. For this reason, a diameter of the flow path of the first outlet passage $11a$ is larger than that of the second outlet passage $12a$ and the third outlet passage so as to flow cooling water at a high flow rate.

The shaft 14 is disposed so as to pass the center of the valve chamber 17. One end of the shaft 14 is rotatably supported via a ball bearing 18 assembled to the housing 3, and the other end of the shaft 14 is rotatably supported via a bearing plate 19 attached to the inlet 16. The bearing plate 19 has an opening that allows cooling water to pass.

The electrical actuator 15 has well-known configuration. For example, the electrical actuator 15 is configured as an electric motor that converts electric power into a rotational torque, a deceleration mechanism that decelerates rotation of the electric motor to increase a driving torque of the shaft 14, and a non-contact rotational angle sensor that detects rotational angle of the shaft 14.

The ball valve 1 is rotated by the electrical actuator 15 via the shaft 14. The ball valve 1 is substantially cup-shaped. Describing the flow direction of cooling water, cooling water supplied from the inlet 16 is fed to the inner side of the ball valve 1 through the cup opening. Then, the ball valve 1 is rotated and the valve opening 1b and the seat opening 2b overlap each other, cooling water flows through the overlapping portion. That is, the valve device in the embodiment rotates the ball valve 1 to change the degree of communication between the inlet 16 and the first to third outlets 13.

Here, the center of a flow path that guides fluid from the outside of the ball valve 1 into the cup is defined as an inlet axis ja. The center of a flow path that discharges fluid from the cup of the ball valve 1 to the first outlet passage 11a is defined as an outlet axis jβ.

In the embodiment, one of the inlet axis ja and the outlet axis jβ is provided in the same direction as the rotational axis of the ball valve 1, and the outlet axis jβ is provided at an obtuse angle relative to the inlet axis ja.

That is, the ball valve 1 has the cup opening provided in the same direction as the rotational axis of the ball valve 1. The rotational axis of the ball valve 1 is provided at an obtuse angle relative to the outlet axis jβ or the inlet axis ja.

This will be specifically described below. The cup opening, which serves as an inlet for fluid in the ball valve 1, is opened in the rotational axis direction. The inlet 16 formed in the housing 3 is also provided in the rotational axis direction of the ball valve 1. In this manner, the inlet axis ja is the same direction as the rotational axis of the ball valve 1.

In the embodiment, among the first outlet passage 11a, the second outlet passage 12a, and the third outlet passage not illustrated, the outlet passage having the largest diameter of the flow path is the first outlet passage 11a that can guide a large quantity of cooling water to the radiator.

In the embodiment, the outlet axis jβ that guides cooling water to the first outlet passage 11a having the largest flow path diameter is provided at an obtuse angle (for example, 100° to 150°) relative to the rotational axis of the ball valve 1.

The center of a flow path that guides fluid from the inner side of the ball valve 1 to the second outlet passage 12a via the valve opening 1b is defined as a second outlet axis jγ. Although not limited, the second outlet axis jγ is formed at right angle relative to the rotational axis.

In the valve device, the cup opening that guides cooling water to the inside of the ball valve 1 is opened in the rotational axis direction of the ball valve 1. The rotational axis of the ball valve 1 is provided at an obtuse angle relative to the outlet axis jβ. That is, the outlet axis jβ is provided at an obtuse angle relative to the inlet axis ja.

Accordingly, a bending angle of cooling water that travels from the inlet 16 to the first outlet passage 11a through the inside of the ball valve 1 can be made gentle, reducing a pressure loss of cooling water that travels from the ball valve 1 toward the first outlet passage 11a.

As described above, since the bending angle from the inlet 16 to the first outlet passage 11a can be made gentle to reduce the pressure loss, the diameter of the first outlet passage 11a and the diameter of the valve opening 1b that guides cooling water to the first outlet passage 11a can be reduced to miniaturize the valve device. That is, the valve device can reduce the pressure loss while being downsized.

The portion of the ball valve 1, which slides on the valve seat 2, has a convex spherical shape and thus, the angle of each of the outlet axis jβ and the second outlet axis jγ with respect to the rotational axis can be flexibly set.

For this reason, when one or both of the first outlet passage 11a and the second outlet passage 12a has a limitation in mounting, the orientation of the first outlet passage 11a and the second outlet passage 12a can be changed so as not to become obstacles, improving the mounting feature of the valve device to vehicles.

Among the first outlet passage 11a, the second outlet passage 12a, and the third outlet passage not illustrated, the outlet passage having the largest diameter of the flow path is the first outlet passage 11a that can guide a large quantity of cooling water to the radiator.

Thus, in the embodiment, the outlet axis jβ of the first outlet passage 11a having a large flow path diameter is provided at an obtuse angle relative to the inlet axis ja.

Accordingly, the bending angle of cooling water travelling from the inlet 16 to the first outlet passage 11a that guides the cooling water to the radiator can be made gentle. For this reason, the pressure loss of a large quantity of cooling water flowing from the engine toward the radiator can be readily suppressed.

Fifth Embodiment

A fifth embodiment will be described below with reference to FIG. 8 to FIG. 11. An engine cooler has a cooling water circuit that forcedly circulates cooling water in an engine 21 to cool the engine 21. The cooling water circuit has a first circuit that circulates cooling water in the engine 21, a radiator 22, and a water pump 23 in this order, a second circuit that circulates cooling water in the engine 21, a heater core 24 of an air conditioner, and the water pump 23 in this order, and a third circuit that circulates cooling water in the engine 21, a device 25, and the water pump 23 in this order.

Cooling water is, for example, LLC containing ethylene glycol. The heater core 24 exchanges heat between cooling water flowing out of the engine 21 and air, to heat the air. The device 25 is, for example, an oil cooler or a turbo charger, and requires heat-exchange with cooling water flowing out of the engine 21.

The engine 21 includes a cylinder head 26 and a cylinder block 27, and the cylinder head 26 and the cylinder block 27 are provided with a water jacket 28 that circulates cooling water.

A valve device 29 that controls the flow rate of cooling water is disposed in the cooling water circuit. The valve device 29 is disposed at an outlet of the water jacket 28. The valve device 29 is a three-direction flow rate adjustment valve that adjusts the flow rate of cooling water in the first circuit, the second circuit, and the third circuit. The valve device 29 may be multi-direction flow rate adjustment valve that adjusts the flow rate in three or more directions.

The cooling water circuit is filled with cooling water by performing a vacuuming process of vacuuming the entire circuit and then, injecting cooling water using the negative pressure. The first circuit has a flow path that bypasses the radiator 22, and a reserve tank 22a provided in the middle of the flow path is vacuumed to inject cooling water.

The valve device 29 includes:

a housing 3 that houses the ball valve 1;

a shaft 14 that penetrates the housing 3, and rotates integrally with the ball valve 1;

a seal member 31 that seals a portion between the housing 3 and the shaft 14; and a labyrinth 32 that attenuates kinetic energy of fluid going toward the seal member 31 in the housing 3.

The housing 3 has a shaft reception hole 33 that penetrates the housing 3 and receives the shaft 14. The shaft reception hole 33 penetrates the housing 3, and has an opening communicating with the valve chamber 17. Hereinafter, the opening of the shaft reception hole 33, which communicates with the valve chamber 17, is referred to as a shaft reception opening 33a.

The axial direction of the shaft reception hole 33 is defined as a valve shaft direction. A side near the valve chamber 17 is defined as one side in the valve shaft direction, and its opposite side is defined as the other side in the valve shaft direction.

The other end of the shaft reception hole 33 in the valve shaft direction is opposed to an actuator chamber 35 formed between a cover 34 attached to the housing 3 and the housing 3. The actuator chamber 35 is a space that houses the gear 36 constituting the deceleration mechanism and so on.

A portion of the shaft 14, which protrudes toward the other side in the valve shaft direction of the shaft reception hole 33, is fixed to the gear 36 in the actuator chamber 35.

In the embodiment, the cup opening of the ball valve 1 is provided as opposed to the shaft reception opening 33a in the valve shaft direction across the ball valve 1.

The shaft 14 is inserted into the shaft reception hole 33, and is rotatably supported by the ball bearing 18 interposed between the housing 3 and the shaft 14.

The ball valve 1 is housed in the valve chamber 17 as well as held in the shaft 14, and is rotated with rotation of the shaft 14 to change the flow rate of cooling water flowing from the cup opening to each valve opening 1b.

The ball valve 1 is fixed to the shaft 14 by inserting the shaft 14 into a shaft hole 14a in the ball valve 1 and fixing the state.

Thus, the opening of the shaft hole 14a is opposed to the shaft reception opening 33a in the valve shaft direction.

The seal member 31 is disposed between the inner circumferential face of the shaft reception hole 33 and the outer circumferential face of the shaft 14 to seal space on the opposite side to the valve chamber 17 against the valve chamber 17 in a liquid-tight manner. The seal member 31 functions to prevent leakage of cooling water from the valve chamber 17 to the actuator chamber 35.

The seal member 31 is a general shaft seal component having an annular metal portion 31a and an annular rubber portion 31b using the metal portion 31a as a core. The rubber portion 31b is made of a rubber material, and has a seal lip that elastically contacts the outer circumferential face of the shaft 14.

The seal lip has a first lip 44a that protrudes toward the one side in the valve shaft direction, a second lip 44b that protrudes toward the other side in the valve shaft direction, and a third lip 44c provided between the first lip 44a and the second lip 44b. Only the first lip 44a may be provided.

The shaft reception hole 33 is enlarged in the inner diameter from the other side in the valve shaft direction toward the one side in the valve shaft direction in two stages. The first stage is referred to as a middle-diameter rear portion 33b, and the second stage is referred to as a large-diameter rear portion 33c. The seal member 31 is disposed at the large-diameter rear portion 33c. The face of the seal member 31 at the other side in the valve shaft direction abuts a stepped face between the middle-diameter rear portion 33b and the large-diameter rear portion 33c. An inner space of the middle-diameter rear portion 33b slightly communicates with the actuator chamber 35 through a clearance of the ball bearing 18 and however, the seal member 31 prevents leakage of cooling water from the valve chamber 17 to the actuator chamber 35.

The labyrinth 32 is provided in a gap extending from the valve chamber 17 to the seal member 31 via the shaft reception opening 33a to attenuate kinetic energy of the cooling water travelling toward the seal member 31.

The labyrinth 32 is formed using a tubular portion 50 that protrudes from an opening edge of the shaft reception opening 33a toward the valve chamber 17 and surrounds the outer circumferential face of the shaft 14 with a clearance C1, and a peripheral wall 51 of the ball valve 1 that is radially opposed to the outer circumferential face 50a of the tubular portion 50 with a clearance C2.

The housing 3 has the tubular portion 50 that protrudes from the opening edge of the shaft reception opening 33a toward the valve chamber 17. The tubular portion 50 protrudes from the inner wall face of the valve chamber 17 toward the one side in the valve shaft direction, and is shaped like a tube that is coaxial with the shaft 14. Specifically, the one end of the large-diameter rear portion 33c in the valve shaft direction defines the shaft reception opening 33a. The inner circumferential face 50b of the tubular portion 50 is flush with the inner circumferential face of the large-diameter rear portion 33c.

The ball valve 1 has a recess 53 formed at a site opposed to the shaft reception opening 33a. The recess 53 has the peripheral wall 51 radially opposed to the outer circumferential face of the shaft 14, and a flat face 54 that is perpendicular to the shaft 14 and is opposed to the end face of the tubular portion 50.

The tubular portion 50 protrudes into the recess 53. That is, the tubular portion 50 and the recess 53 overlap each other in the valve shaft direction, and the tubular portion 50 and the peripheral wall 51 overlap each other in the radial direction.

Thus, the flow of cooling water travelling from the valve chamber 17 toward the seal member 31 must pass through the clearance C2 between the peripheral wall 51 and the outer circumferential face 50a of the tubular portion 50 and a clearance C3 between the flat face 54 and the one-side face of the tubular portion 50 in the valve shaft direction. That is, the flow path from the valve chamber 17 to the seal member 31 through the shaft reception opening 33a meanders to attenuate kinetic energy of cooling water travelling toward the seal member 31.

The tubular portion 50 has a stopper 56 that locks the ball valve 1 in the rotating direction and limits the rotational range of the ball valve 1 with respect to the housing 3. The stopper 56 is provided as a protruding portion that protrudes from the outer circumferential face 50a of the tubular portion 50 toward the outer circumference.

The stopper 56 can contact the protruding portion 57 provided on the peripheral wall 51 so as to protrude inward, in the rotating direction. Thus, the ball valve 1 stops its rotation at the position where the stopper 56 contacts the protruding portion 57.

The valve device 29 includes a labyrinth 32 that attenuates kinetic energy of cooling water travelling from the valve chamber 17 toward the seal member 31 via the shaft reception opening 33a.

The labyrinth 32 attenuates kinetic energy of cooling water travelling from the valve chamber 17 toward the seal member 31 via the shaft reception opening 33a, reducing a shock caused when cooling water hits against the seal member 31 to prevent peeling of the first lip 44a.

Therefore, leakage of cooling water from the valve chamber 17 through the shaft reception hole 33 can be reliably prevented.

Specifically, by vacuuming the cooling water circuit and then, injecting cooling water, the valve device 29 is filled with cooling water. In this manner, in the process of injecting cooling water, cooling water forcibly flows into the valve chamber 17. For this reason, with conventional configuration, a first lip 44a may be peeled by a large shock of the water pressure. On the contrary, in the embodiment, the labyrinth 32 can present peeling of the first lip 44a.

The labyrinth 32 is formed by the tubular portion 50 that surrounds the outer periphery of the shaft 14 with the clearance C1, and the peripheral wall 51 radially opposed to the outer circumferential face 50a of the tubular portion 50 with the clearance C2. This can readily form the labyrinth 32.

The tubular portion 50 has the stopper 56 that limits the rotational range of the ball valve 1.

Generally, a stopper that limits the rotational range of the ball valve 1 is provided in the housing 3 so as to lock a gear 36. However, in this case, when the fixation site of the shaft 14 and the ball valve 1 is broken, only the shaft 14 is limited in its rotation, and the ball valve 1 goes into s freewheeling condition.

On the contrary, in the embodiment, since the stopper 56 directly stops rotation of the ball valve 1, even when the fixation site of the shaft 14 and the ball valve 1 is broken, rotation of the ball valve 1 can be stopped.

(Modifications in the Fifth Embodiment)

The labyrinth 32 is not limited to the above embodiment. For example, as illustrated in FIG. 12, in addition to the peripheral wall 51, a peripheral wall 59 radially opposed to an inner circumferential face 50b of the tubular portion 50 with a clearance C4 may be provided in the ball valve 1.

Thus, an inner circumferential side face of a peripheral groove 60 forms the peripheral wall 59 radially opposed to the inner circumferential face 50b of the tubular portion 50 with the clearance C4, and an outer circumferential side face of the peripheral groove 60 forms the peripheral wall 51 radially opposed to the outer circumferential face 50a of the tubular portion 50 with the clearance C2.

Figure 12:
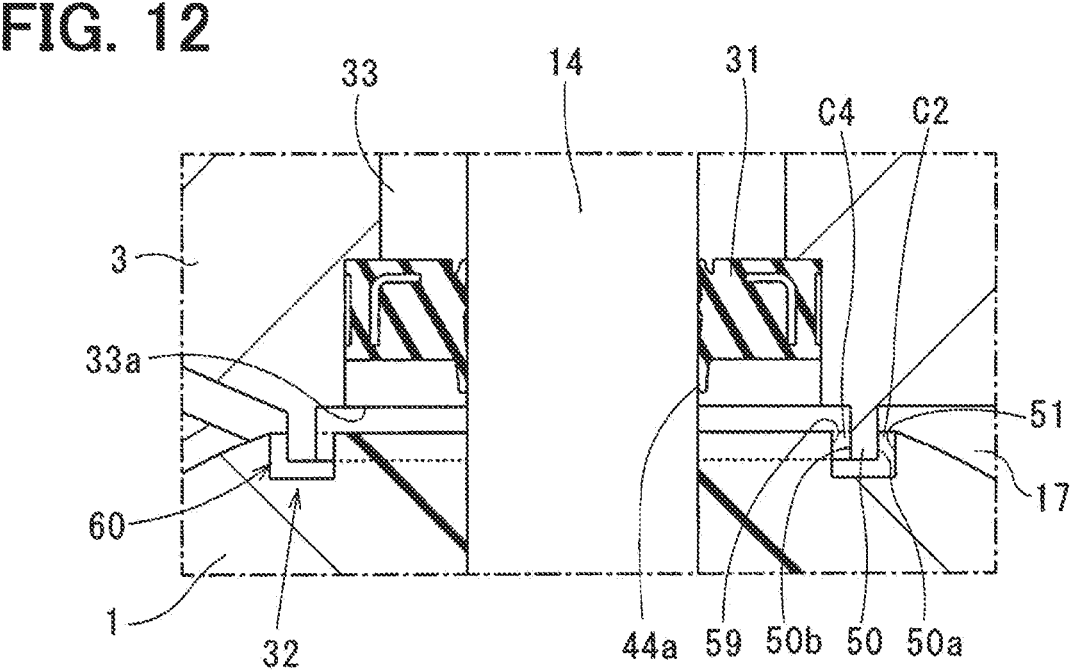
FIG. 12 is a sectional view illustrating a valve device (a modification of the fifth embodiment).

The labyrinth 32 illustrated in FIG. 12 also can cause the flow path extending from the valve chamber 17 to the seal member 31 via the shaft reception opening 33a to meander, thereby attenuating kinetic energy of cooling water travelling toward the seal member 31.

As illustrated in FIG. 12, the inner diameter of the tubular portion 50 may be larger than the diameter of the shaft reception opening 33a to surround the shaft reception opening 33a.

In a modification of the configuration illustrated in FIG. 12, the peripheral wall 51 may be omitted. That is, with the configuration, the ball valve 1 has the peripheral wall 59 radially opposed to the inner circumferential face 50b of the tubular portion 50 with the clearance C4 to form the labyrinth 32.

Figure 13:
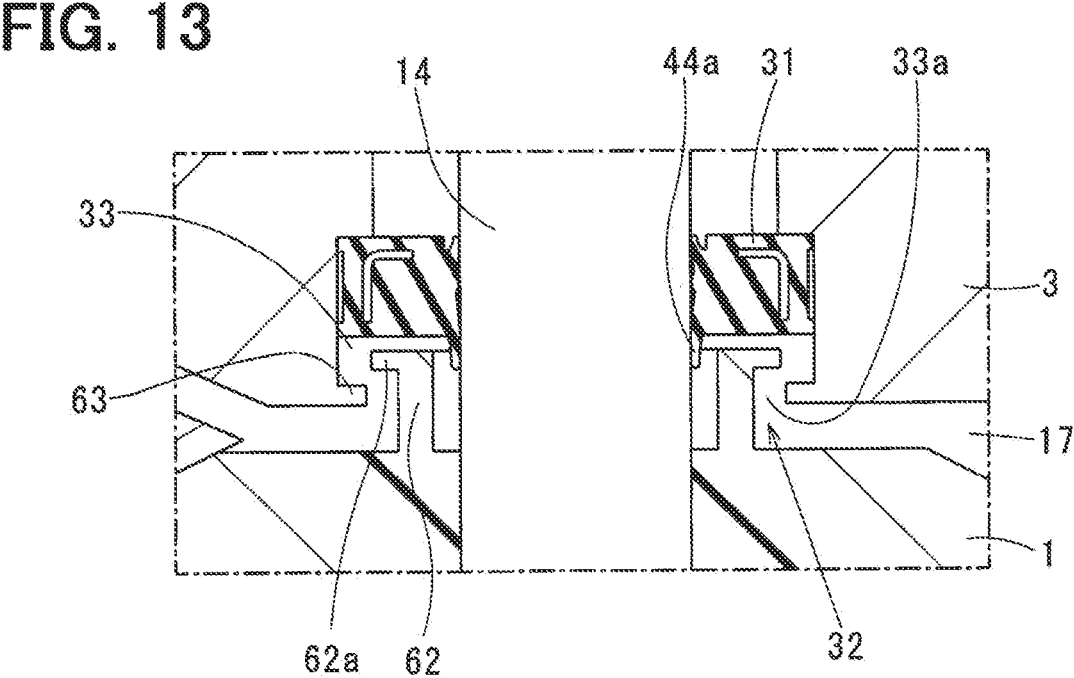
FIG. 13 is a sectional view illustrating a valve device (a modification of the fifth embodiment).

Alternatively, as illustrated in FIG. 13, the ball valve 1 may have a tubular portion 62 inserted into the shaft reception hole 33 to form the labyrinth 32.

In this case, the tubular portion 62 may be disposed such that the first lip 44a is located on the inner side of the tubular portion 62. A flange 62a that extends outward may be provided on the other end of the tubular portion 62 in the valve shaft direction, and an inner flange 63 that protrudes inward may be provided on the inner circumferential face of the shaft reception hole 33, which is closer to the one side in the valve shaft direction than the flange 62a.

With the configuration illustrated in FIG. 13, the seal member 31 is assembled by being passed on the inner side of the inner flange 63 while being compressively deformed. Alternatively, after assembling of the seal member 31, the inner flange 63 as a separate member may be assembled.

The labyrinth 32 illustrated in FIG. 13 also can cause the flow path extending from the valve chamber 17 to the seal member 31 via the shaft reception opening 33a to meander, thereby attenuating kinetic energy of cooling water travelling toward the seal member 31.

In the embodiments, the ball valve 1 is cup-shaped. However, the ball valve 1 may have any shape as long as the face that slides on the valve seat 2 has a convex spherical shape.

In the embodiments, the ball valve 1 and the valve seat 2 may be made of resin. However, the material for the ball valve 1 and the valve seat 2 is not limited.

In the embodiments, the curvature radius R1 of the ball face 1a is smaller than the curvature radius R2 of the seat face 2a. However, the curvature radius R1 of the ball face 1a may be equal to the curvature radius R2 of the seat face 2a.

In the embodiments, the curvature difference between the ball face 1a and the seat face 2a forms the contact ring A. However, the contact ring A may be formed in any suitable manner. For example, when the curvatures of the ball face 1a and the seat face 2a are same as each other, the contact ring A may be provided by forming an annular rib on the radially inner side of the seat face 2a.

In the embodiments, the sleeve 8 is fixed to the valve seat 2 by press-fitting. However, the sleeve 8 may be fixed to the valve seat 2 using an adhesive, for example.

In the embodiments, fluid flows from the inner side to the outer side of the ball valve 1 at opening. However, fluid may flow in the opposite direction.

In the embodiments, the electrical actuator 15 rotates the ball valve 1. However, the ball valve 1 may be driven by any means.

In the embodiments, the compression coil spring is used as an example of the spring 6. However, the ball valve 1 and the valve seat 2 may be compressed by any means.

In the embodiments, the present disclosure is applied to the valve device that controls engine cooling water. However, the present disclosure may be applied to a valve device that controls cooling water in a vehicle including no engine.

In the embodiments, the present disclosure is applied to the valve device that controls liquid. However, fluid is not limited to liquid, and the present disclosure may be applied to a valve device that controls gas.

The above-described plurality of the embodiments may be combined.

What is claimed is:

1. A valve device configured to control a flow rate of cooling water for a vehicle, comprising:
   a valve;
   a housing that houses the valve; and
   a shaft that rotates integrally with the valve, wherein the valve has an internal space through which the cooling water flows in and out, and a plurality of valve openings to allow the internal space to communicate with outside of the valve, the housing has a seat opening through which the cooling water flows, a first valve opening of the plurality of valve openings communicates with the seat opening when the valve rotates around the shaft, a second valve opening of the plurality of valve openings opens in a rotation axial direction of the valve, an inner wall surface of the valve surrounding the internal space has a convex portion protruding toward the second valve opening in a region facing the second valve opening in the rotation axial direction, and the convex portion has a slope that approaches an axis of the shaft as extending toward the second valve opening; wherein:

the plurality of valve openings has a third valve opening different from the first valve opening and the second valve opening, the third valve opening is defined at a position different from the first valve opening with reference to a rotational axis, and the slope is adjacent to the first valve opening and away from the third valve opening.

2. The valve device according to claim 1, wherein the slope is located at least between the first valve opening and the shaft.

3. The valve device according to claim 1, wherein the convex portion is formed so as to extend from the first valve opening toward the shaft.

4. The valve device according to claim 1, wherein the convex portion is formed so as to extend from a bottom portion of the inner wall surface that is the farthest from the second valve opening in the rotation axial direction toward the shaft.

5. The valve device according to claim 1, wherein the slope and the first valve opening are arranged to overlap with each other in position in a rotational direction or the rotation axial direction.

6. The valve device according to claim 5, wherein the cooling water flows into the internal space through the second valve opening and flows out of the internal space through the first valve opening.

7. A valve device configured to control a flow rate of cooling water for a vehicle, comprising:

a valve;

a housing that houses the valve; and a shaft that rotates integrally with the valve, wherein the valve has an internal space through which the cooling water flows in and out, and a plurality of valve openings to allow the internal space to communicate with outside of the valve, the housing has a seat opening through which the cooling water flows, a first valve opening of the plurality of valve openings communicates with the seat opening when the valve rotates around the shaft, a second valve opening of the plurality of valve openings opens in a rotation axial direction of the valve, an inner wall surface of the valve surrounding the internal space has a convex portion protruding toward the second valve opening in a region facing the second valve opening in the rotation axial direction, and the convex portion has a slope that approaches an axis of the shaft as extending toward the second valve opening; wherein the plurality of valve openings has a third valve opening different from the first valve opening and the second valve opening, a distance from the second valve opening to the third valve opening in the rotation axial direction is shorter than a distance from the second valve opening to the first valve opening in the rotation axial direction, and the slope is adjacent to the first valve opening and away from the third valve opening.

8. A valve device comprising:

a valve that rotates to change a flow rate of cooling water for a vehicle;

a housing that houses the valve; and a shaft that rotates integrally with the valve, wherein the housing has a stopper that regulates a rotation range of the valve with respect to the housing, the valve has a contact portion that stops rotation of the valve by contacting with the stopper at one side of the valve in an extending direction of the shaft, the valve has a peripheral wall facing an outer peripheral surface of the shaft, and the contact portion protrudes from the peripheral wall toward the one side in the extending direction of the shaft at the one side of the valve.

9. The valve device according to claim 8, wherein the valve and the housing have an open side open in a rotation axial direction of the valve to allow the cooling water to flow, the valve facing the one side has a recessed surface recessed toward the open side of the valve with respect to the peripheral wall, and the contact portion and a part of the stopper are configured to come into contact with each other in a space surrounded by the peripheral wall on the one side of the recessed surface to stop the rotation of the valve.

10. The valve device according to claim 9, wherein the valve has an internal space through which the cooling water flows in and out, the valve has a plurality of valve openings to allow the internal space to communicate with outside of the valve, in addition to the open side open in the rotation axial direction of the valve, and the plurality of valve openings are arranged in the extending direction of the shaft.

11. The valve device according to claim 8, wherein the stopper is only one stopper and the contact portion is only one contact portion.

12. The valve device according to claim 8, wherein the stopper extends in a circumferential direction about a rotation axis of the valve.

13. The valve device according to claim 8, wherein the stopper is connected to the housing in a radial direction about a rotation axis of the valve, and is connected to the housing in a rotation axial direction of the valve.

14. The valve device according to claim 8, wherein the stopper is longer in a circumferential direction about a rotation axis of the valve than the contact portion is.

15. The valve device according to claim 8, wherein the housing has a through hole to support the shaft as a bearing opening, the valve has a recess at a position facing a shaft reception opening of the bearing opening which is open toward the valve, and the recess has a peripheral wall facing an outer peripheral surface of the shaft in a radial direction about a rotation axis of the valve, and a flat portion perpendicular to the shaft.

16. The valve device according to claim 15, wherein
the housing has a tubular portion that surrounds the outer peripheral surface of the shaft, and
the flat portion faces an end surface of the tubular portion.

17. The valve device according to claim 8, further comprising
a first circuit that circulates the cooling water to a radiator,
a second circuit that circulates the cooling water to a heater core of an air conditioner, and
a third circuit that circulates the cooling water by bypassing the radiator and the heater core, wherein
the valve device is arranged in a cooling circuit having the first circuit, the second circuit and the third circuit to control a flow rate of the cooling water flowing through the first circuit, the second circuit, and the third circuit.

\* \* \* \* \*